United States Patent [19]
Knight

[11] Patent Number: 5,452,623
[45] Date of Patent: Sep. 26, 1995

[54] NOISE AND VIBRATION DAMPER FOR A TRANSMISSION SHIFT LEVER

[75] Inventor: Gordon W. Knight, Canton, Mich.

[73] Assignee: Dana Corporation, Toledo, Ohio

[21] Appl. No.: 220,846

[22] Filed: Mar. 31, 1994

[51] Int. Cl.⁶ .................................................. B60K 20/04
[52] U.S. Cl. ............................ 74/473 R; 74/523; 403/225
[58] Field of Search ..................... 74/473 R, 523, 74/524; 403/224, 225, 305, 221, 228; 181/207

[56] References Cited

U.S. PATENT DOCUMENTS

| | | |
|---|---|---|
| 1,927,646 | 1/1933 | Miller . |
| 3,601,431 | 8/1971 | Henley . |
| 3,657,943 | 4/1972 | Bruhn et al. ............ 74/473 R X |
| 3,687,404 | 8/1972 | Werner .................. 403/224 X |
| 4,492,129 | 1/1985 | Hasegawa . |
| 4,528,863 | 7/1985 | Theodore et al. ........... 74/473 R |
| 4,569,246 | 2/1986 | Katayama et al. . |
| 4,603,598 | 8/1986 | Tsuji et al. . |
| 4,960,009 | 10/1990 | Schultz et al. . |
| 5,189,925 | 3/1993 | Neal et al. . |
| 5,347,881 | 9/1994 | Watson et al. ............ 74/473 R |

FOREIGN PATENT DOCUMENTS

| 283722 | 10/1990 | Germany ................ 74/473 R |
|---|---|---|

OTHER PUBLICATIONS

Eaton Fuller Transmissions, S-1607 Isolater Assembly, 2 pages, dated Oct. 2, 1992.
Rockwell Isolater Assembly—Straight Lever, 2 pages, undated.

*Primary Examiner*—Rodney H. Bonck
*Attorney, Agent, or Firm*—MacMillan, Sobanski & Todd

[57] ABSTRACT

A shift lever assembly includes a noise and vibration damper. A first shift lever member has a first end adapted to be grasped by a vehicle driver and a second end connected to the damper. A second shift lever member has a first end connected to the vehicle transmission and a second end connected to the damper. A hollow housing is provided having a first end to which an end of the first shift lever member is secured, and a second end which is open and in which an end of the second shift lever member is received. Rigid outer and inner sleeves are disposed within the housing and spaced radially from each other. An end of the second shift lever member extends through the second, open end of the housing and is received within the inner sleeve. A layer of a noise and vibration dampening material, such as rubber, is disposed between the inner sleeve and the outer sleeve. A rod extends through aligned apertures formed in the housing, the outer sleeve, the inner sleeve and the second shift lever member to retain both sleeves and the end of the second shift lever member within the housing.

20 Claims, 1 Drawing Sheet

NOISE AND VIBRATION DAMPER FOR A TRANSMISSION SHIFT LEVER

BACKGROUND OF THE INVENTION

This invention relates in general to shift levers for effecting gear changing operations in manually operable vehicle transmissions and, in particular, to a noise and vibration damper for such a shift lever.

In most vehicles, a transmission is provided in the drive train between the engine and the driven wheels. As is well known, the transmission includes a plurality of gears which are selectively engaged to provide a plurality of speed reduction gear ratios between the input and the output of the transmission. A control member within the transmission is moved by a driver of the vehicle throughout a plurality of gear ratio positions for selecting the desired speed reduction. As a result, acceleration and deceleration of the vehicle can be achieved in a smooth and efficient manner.

In many smaller vehicles, such as automobiles, the transmission functions automatically to move the control member without any intervention by the driver of the vehicle. However, such an automatic transmission is typically not used in larger vehicles, such as trucks, because of the increased size and expense. Such vehicles are, therefore, often provided with a manually operable transmission, where the shifting of the control member is accomplished by physical movement of the control member by the vehicle driver.

In order to shift the control member between the gear ratio positions in a manual transmission, a mechanical shift lever assembly is generally provided. A lower end of the Shift lever assembly extends downwardly within the transmission into engagement with the control member. The upper end of the shift lever assembly extends upwardly into an area in which it is convenient for the vehicle driver to grasp and manipulate it. Thus, when the upper end of the shift lever assembly is moved by the vehicle driver, the lower end is also moved within the transmission. By properly moving the upper end of the shift lever assembly, the vehicle driver may position the control member of the transmission to select any one of a plurality of gear ratios for use.

When the vehicle is operated, it has been found that the transmission and other components of the drive train of the vehicle vibrate to a certain extent. In addition, vibrations are generated by the vehicle engine itself during operation. All of such vibrations can be sensed by the vehicle driver as undesirable noise. To reduce the amount of this undesirable noise, the driver compartment of the vehicle is typically lined with acoustical insulating material. Unfortunately, the shift lever assembly must extend upwardly from the transmission into the driver compartment for convenient use. As a result, the shift lever assembly transmits these vibrations into the driver compartment, thereby by defeating the acoustical insulation. Further, the undesirable vibration of the upper end of the shift lever is unaffected by the acoustical insulation.

To address this, it is known to provide the shift lever assembly with a vibration and noise dampening mechanism. Such mechanisms are designed to reduce or prevent the vibrations from the engine and transmission from being transmitting through the shift lever assembly to the driver compartment of the vehicle. A typical vibration and noise dampening mechanism includes one or more elastic damping members disposed within a cylindrical housing. A lower shift lever member has a lower end connected to the transmission and an upper end secured within the housing of the dampening mechanism. An upper shift lever member has a lower end connected to the housing of the dampening mechanism. The dampening mechanisms thereby provide a mechanical connection between the lower shift lever member and the upper shift lever member which reduces the transmission of vibrations therebetween.

Known vibration and noise dampening mechanisms, however, have not proven effective in reducing the transmission of vibrations for periods of extended use. In addition, such mechanisms have often been unduly complex and difficult to construct and assemble. Accordingly, it would be desirable to provide an improved noise and vibration damper for a shift lever assembly which effectively reduces the transmission of vibration over extended periods of use. It would also be desirable to provide an improved noise and vibration damper which is simple and inexpensive to construct and assemble.

SUMMARY OF THE INVENTION

This invention relates to an improved noise and vibration damper for a transmission shift lever. A first shift lever member has a first end adapted to be grasped by the vehicle driver and a second end connected to the damper. A second shift lever member has a first end connected to the vehicle transmission and a second end connected to the damper. The second end of the second shift lever member has an aperture formed therethrough. The damper includes a hollow housing having a first end which is secured to the second end of the first shift lever member. The housing includes a second end which is open and within which the first end of the second shift lever member is received. The housing includes a pair of apertures formed therethrough. A rigid outer sleeve is disposed within the housing. The outer sleeve has a pair of apertures formed therethrough which are aligned with the apertures in the housing. A rigid inner sleeve is spaced concentrically with the outer sleeve. The inner sleeve is similarly provided with a pair of apertures formed therethrough which are aligned with the apertures in the housing. The second end of the second shift lever member extends through the open end of the housing and is received within the inner sleeve. A hollow, cylindrical layer of a noise and vibration dampening material, such as rubber, is disposed between the inner sleeve and the outer sleeve. A rod extends through the apertures in the housing, the outer sleeve, the inner sleeve, and the second shift lever member to retain both sleeves and the end of the second shift lever member within the housing.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
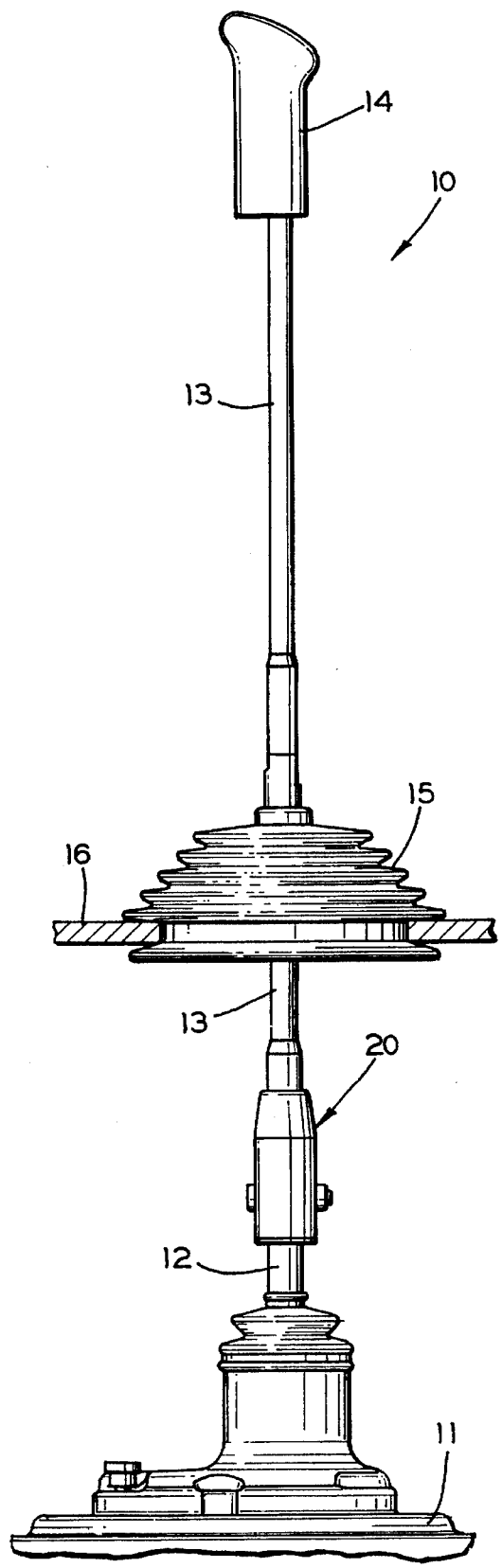
FIG. 1 is an elevational view of a transmission shift lever assembly including a noise and vibration dampening mechanism in accordance with this invention.

Referring now to the drawings, there is illustrated in FIG. 1 a shift lever assembly, indicated generally at 10, in accordance with this invention. The shift lever assembly 10 is connected for use with a conventional manually operable vehicle transmission 11. As is well known in the art, the vehicle transmission 11 includes a plurality of gears (not shown) which are selectively engaged to provide a plurality of speed reduction gear ratios between the input and the output of the transmission 11. A control member (not shown) within the transmission 11 is moved by a driver of the vehicle throughout a plurality of gear ratio positions for selecting the desired speed reductions.

The shift lever assembly 10 includes a lower shift lever member 12 which is connected to the control member of the transmission 11 for moving such control member between the various gear ratio positions. Thus, by moving the lower shift lever member 12, the transmission 11 can be operated to provide a desired gear ratio between the input and the output thereof. As will be explained in more detail below, the shift lever assembly 10 allows the driver of the vehicle to easily move the lower shift lever member 12.

The shift lever assembly 10 also includes an elongated upper shift lever member 13 having a handle 14 mounted on the upper end thereof. The handle 14 is sized to be easily grasped by the driver of the vehicle. The upper shift lever member 13 extends downwardly from the handle 14 through a flexible elastomeric boot 15 mounted in a relatively large diameter hole formed through a floor of the vehicle 16. The floor 16 functions as a divider between the driver compartment of the vehicle and the engine and drive train compartment. If desired, appropriate acoustical insulating material (not shown) may be incorporated into the floor 16 to reduce the amount of undesirable noise transmitted to the driver compartment.

Beneath the floor 16, the lower end of the upper shift lever member 13 extends further downwardly into engagement with a noise and vibration damper, indicated generally at 20. Similarly, the upper end of the lower shift lever member 12 extends upwardly into engagement with the damper 20. As shown in the drawings, the lower end of the upper shift lever member 13 is received within the upper end of the damper 20, while the upper end of the lower shift lever member 12 is received within the lower end of the damper 20. In certain vehicles, it may be necessary to position the damper 20 above the floor 16. In such vehicles, the damper 20 will have little effect on the transmission of noise to the driver compartment, but will still reduce the vibrations sensed by the driver when grasping the upper shift lever member 13. The structure and operation of the noise and vibration damper 20 is explained in detail below.

Figure 2:
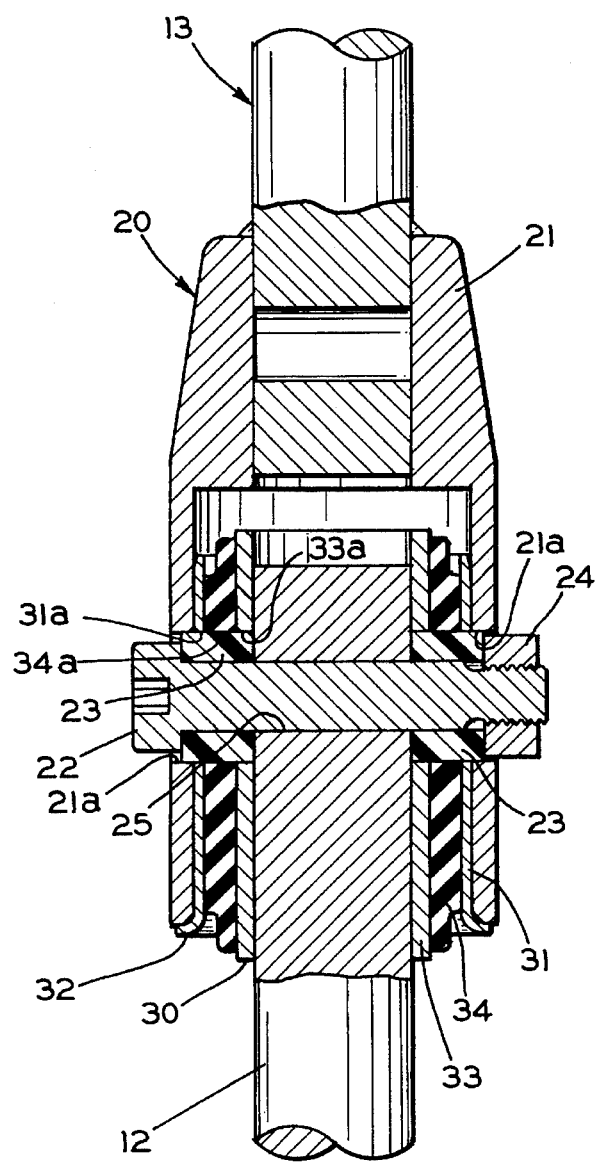
FIG. 2 is an enlarged sectional elevational view of the noise and vibration dampening mechanism illustrated in FIG. 1.

Referring now to FIG. 2, it can be seen that the damper 20 includes a hollow, generally cylindrical housing 21 having a pair of apertures 21a formed therethrough. The apertures 21a are formed in opposed fashion on the housing 21 so as to define a common axis therethrough which is transverse relative to the housing 21. The housing 21 is preferably formed of a rigid metal, such as steel.

A rod, such as the metallic shoulder bolt 22, extends through the apertures 21a formed in the housing 21. The ends of the shoulder bolt 22 are supported within the apertures 21a by a pair of bushings 23. The bushings 23 are formed from a rigid, low friction material, such as nylon. A nut 24 is threaded on to the end of the shoulder bolt 22 to retain it to the housing 21 of the damper 20.

As mentioned above, the lower end of the upper shift lever member 13 is received within the upper end of the housing 21 of the damper 20. The lower end of the upper shift lever member 13 is closely fitted with an inner peripheral surface of the upper end of the housing 21. The lower end of the upper shift lever member 13 is secured to the housing 20, such as by welding or adhesive bonding. Preferably, the lower end of the upper shift lever member 13 is welded to the housing 20. Alternatively, the lower end of the upper shift lever member 13 may be provided with external threads which mate with internal threads provided on the inner peripheral surface of the upper end of the housing 20.

The upper end Of the lower shift lever member 12 is received within the lower end of the housing 21 of the damper 20. An aperture 25 is formed through the upper end of the lower shift lever member 12. The aperture 25 is adapted to be aligned with the apertures 21a formed in the housing 21. The shoulder bolt 22 is thus permitted to extend through the apertures 21a in the housing 21 and the aperture 25 through the upper end of the lower shift lever member 12. The shoulder bolt 22 thereby retains the upper end of the lower shift lever member 12 within the lower end of the housing 21. When installed, the upper end of the lower shift lever member 12 is spaced apart from the lower end of the upper shift lever member 13. The bushings 23 are preferably sized such that they abut the upper end of the outer circumferential surface of the lower shift lever member 12 when installed as shown. As a result, the lower shift lever member 12 is reliably secured to the housing 21 so as to prevent it from being withdrawn therefrom without first removing the nut 24 and the shoulder bolt 22.

The damper 20 is also provided with a hollow isolator bushing assembly 30 secured within the lower end of the housing 21. The isolator bushing assembly 30 includes a rigid outer sleeve 31 having a pair of apertures 31a formed therethrough. The apertures 31a are adapted to be aligned with the apertures 21a in the housing 21 and are sized so as to tightly receive the bushings 23. When so aligned, the shoulder bolt 22 extends through the apertures 31a to retain the outer sleeve 31 within the housing 21. The outer diameter of the outer sleeve 31 is preferably approximately the same as the inner diameter of the lower end of the cylindrical housing 21. As a result, the outer sleeve 31 is press fit within the lower end of the housing 21. The lower end of the outer sleeve 31 is provided with a generally radially extending collar portion 32 which abuts the end surface of the housing 21 when installed as shown.

The isolator bushing assembly 30 also includes a rigid inner sleeve 33 having a pair of apertures 33a formed therethrough. The apertures 33a are adapted to be aligned with the apertures 21a in the housing 21 and are sized so as to tightly receive the bushings 23. When so aligned, the shoulder bolt 22 extends through the apertures 33a to retain the inner sleeve 31 within the housing 21. The inner sleeve 33 is generally concentric with the outer sleeve 31. The upper end of the lower shift lever member 12 extends through the inner sleeve 33. The inner diameter of the inner sleeve 31 is only slightly larger than the outer diameter of the upper end of the lower shift lever member 12, providing a good slip fit therein without play. The outer and inner sleeves 31 and 33, respectively, are preferably formed from a rigid metal, such as steel.

A hollow, generally cylindrical layer 34 of a resilient noise and vibration dampening material, such as rubber, extends between the inner and outer sleeves 31 and 33, respectively, of the isolator bushing assembly 30. The layer 34 fills the space between the inner and outer sleeves 31 and 33, respectively. The layer 34 is provided with a pair of apertures 34a formed therethrough. The apertures 34a are adapted to be aligned with the apertures 21a in the housing 21, the apertures 31a in the outer sleeve 31, and the apertures 33a in the inner sleeve 33, and are sized so as to tightly receive the bushings 23. When so aligned, the shoulder bolt 22 extends through the apertures 34a to retain the layer 34 in position. Preferably, the outer circumferential surface of the layer 34 is secured to the inner circumferential surface of the outer sleeve 31, such as by adhesive bonding. Similarly, the inner circumferential surface of the layer 34 is preferably secured to the outer circumferential surface of the inner sleeve 33, such as by adhesive bonding.

When fully assembled, the shoulder bolt 22 is supported in the bushings 23 and extends through the apertures 21a, 31a, 34a, 33a and 25 formed respectively in the housing 21, the outer sleeve 31, the layer 34, the inner sleeve 33 and the upper end of the lower shift lever member 12. The shoulder bolt 22, cooperating with the nut 24, thereby securely retains the isolator bushing assembly 30 and lower shift lever member 12 within the lower end of the housing 21 of the damper 20.

The damper 20 acoustically isolates the upper shift lever member 13 from the vibrating lower shift lever member 12. Such acoustical isolation is primarily provided by the layer 34 of vibration dampening material, which absorbs most of the vibrations of the lower shift lever member 12. The nylon bushings 23 isolate the shoulder bolt 22 from the housing 21 to further reduce the amount of transmitted vibration. The damper 20 thus greatly reduces the amount of vibration transmitted from the lower shift lever member 12 to the upper shift lever member 13. The amount of noise transmitted into the driver compartment of the vehicle is therefore also reduced by the damper 20.

Despite the fact that the damper 20 reduces transmitted vibration, the shift lever assembly 10 of the invention retains a firm "feel" during use. In other words, the upper shift lever member 13 is not greatly angled or tilted relative to the lower shift lever member 12 when it is grasped and moved by the driver of the vehicle. The outer and inner sleeves 31 and 33, respectively, cooperate with the nylon bushings 23 and shoulder bolt 22 to act as positive stops when such angling or tilting occurs.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A damper adapted to be connected to an end of a lever member comprising:

a hollow housing having an open end and a pair of apertures formed therethrough;

a rigid outer sleeve disposed within said housing having a pair of apertures formed therethrough which are aligned with said apertures in said housing;

a rigid inner sleeve disposed within said outer sleeve and having a pair of apertures formed therethrough which are aligned with said apertures in said housing, said inner sleeve being adapted to receive therein the end of the lever member extending through said open end of said housing;

a layer of a noise and vibration dampening material disposed between said inner sleeve and said outer sleeve; and a rod extending through said apertures in said housing, said outer sleeve, and said inner sleeve.

2. A damper as defined in claim 1 further including a pair of bushings mounted on the ends of said rod.

3. A damper as defined in claim 2 wherein said bushings are formed of a rigid, low friction plastic material.

4. A damper as defined in claim 1 wherein said layer of dampening material includes a pair of apertures formed therethrough which are aligned with the apertures in said housing.

5. A damper as defined in claim 1 wherein said rod is a shoulder bolt, and said damper further includes a nut which retains said bolt within the apertures in said housing.

6. A damper as defined in claim 1 wherein an outer diameter defined by said outer sleeve is approximately equal to an inner diameter defined by said open end of said housing.

7. A damper as defined in claim 1 wherein said dampening material is rubber.

8. A damper as defined in claim 1 wherein said inner sleeve is formed of steel.

9. A damper as defined in claim 1 wherein said outer sleeve is formed of steel.

10. A shift lever assembly, comprising:

a first shift lever member;

a second shift lever member having an aperture formed therethrough;

a hollow housing having a first end to which an end of said first shift lever member is secured and a second end which is open and in which an end of said second shift lever member is received, said housing having a pair of apertures formed therethrough;

a rigid outer sleeve disposed within said housing having a pair of apertures formed therethrough which are aligned with said apertures in said housing;

a rigid inner sleeve disposed within said outer sleeve and having a pair of apertures formed therethrough which are aligned with said apertures in said housing, the end of said second shift lever member extending through said second open end of said housing and being received within said inner sleeve;

a layer of a noise and vibration dampening material disposed between said inner sleeve and said outer sleeve; and a rod extending through said apertures in said housing, said outer sleeve, said inner sleeve, and said second shift lever member.

11. A shift lever assembly as defined in claim 10 wherein the first end of said housing includes a bore within which said end of said first shift lever member is received.

12. A shift lever assembly as defined in claim 10 wherein said end of said first shift lever member is welded to said housing.

13. A shift lever assembly as defined in claim 10 further including a pair of bushings mounted on the ends of said rod.

14. A shift lever assembly as defined in claim 13 wherein said bushings are formed of a rigid, low friction plastic material.

15. A-shift lever assembly as defined in claim 13 wherein said bushings abut said second shift lever member.

16. A shift lever assembly as defined in claim 10 wherein said layer of dampening material includes a pair of apertures formed therethrough which are aligned with said apertures in said housing.

17. A shift lever assembly as defined in claim 10 wherein said rod is a shoulder bolt, and said damper further includes a nut which retains said bolt within said apertures in said housing.

18. A shift lever assembly as defined in claim 10 an outer diameter defined by said outer sleeve is approximately equal to an inner diameter defined by said open end of said housing.

19. A shift lever assembly as defined in claim 10 wherein said dampening material is rubber.

20. A shift lever assembly as defined in claim 10 wherein said dampening material is bonded to said outer sleeve and to said inner sleeve.

\* \* \* \* \*